United States Patent [19]

Bogdan et al.

[11] Patent Number: 4,753,770
[45] Date of Patent: Jun. 28, 1988

[54] CONTROL SYSTEM FOR HEAT SUPPLY AS HOT WATER FROM NUCLEAR POWER PLANTS EQUIPPED WITH CONDENSATION UNITS

[75] Inventors: Horia Bogdan; Ion Ionescu; Radu Marinescu; Margarios Salgian; Serban Samoila; Mircea Voinea, all of Bucharest, Romania

[73] Assignee: Institutul de Studii Si Proiectari Energetice, Bucharest, Romania

[21] Appl. No.: 14,225

[22] Filed: Feb. 12, 1987

[51] Int. Cl.$^4$ ............................................. G21C 17/00
[52] U.S. Cl. .................................... 376/246; 376/211; 376/247; 376/297; 376/317
[58] Field of Search ............... 376/245, 246, 247, 317, 376/297, 211

[56] References Cited

U.S. PATENT DOCUMENTS 4,299,660  11/1981  Quade ................................. 376/317

FOREIGN PATENT DOCUMENTS 0098396  6/1985  Japan .................................. 376/317

OTHER PUBLICATIONS

Nuclear Eng. Int., Feb. 1979, pp. 44–47, Mustoe.

Atomic Energy Review, vol. 17, No. 4, 1979, Beresovski et al, pp. 915–944.

Primary Examiner—Harvey E. Behrend
Attorney, Agent, or Firm—Karl F. Ross; Herbert Dubno

[57] ABSTRACT

This invention relates to a control system for heat supply as hot water from nuclear power plants equipped with condensation units. This leads to the increased efficiency of the nuclear power plant on the basis of heat extraction from the turbine and its utilization for district heating with hot water as agent. The system requires a turbine nonadjustable bleeding through which a steam flow is extracted. A flow nozzle for steam flow measurement is provided on the steam transport line, a pressure transducer which sends a signal to a comparing and control unit which receives also a signal from another pressure transducer located on the turbine first stage. The comparing and control unit actuates the motorized steam and condensate valves, performing the turbine protection in case that the steam flow extracted at the nonadjustable bleeding exceeds the allowed limit. The delivered heat control is performed indirectly by water flow variation in the secondary circuit of district heating by means of a motorized control valve. This control valve is controlled by means of a heat calculation unit which receives signals from a flow transmitter and two thermoresistances.

1 Claim, 1 Drawing Sheet

CONTROL SYSTEM FOR HEAT SUPPLY AS HOT WATER FROM NUCLEAR POWER PLANTS EQUIPPED WITH CONDENSATION UNITS

FIELD OF THE INVENTION

This invention relates to a control system designed for the controlled heat supply from nuclear power plants (NPP), equipped with condensation units, for the district heating of consumers located at large distances from the NPP.

BACKGROUND OF THE INVENTION

Systems for the direct control of steam extracted from dedicated adjustable bleeding from a conventional steam power plants operated on fossil fuels are known.

The main disadvantage of using such known systems at the NPP turbines is the impossibility of observing the conditions imposed by the turbine and the turbine steam generator and reactor assembly.

Another disadvantage of the use of a direct control element for the steam flow with nonadjustable bleeding is that it implies large inconveniences due to large sizes, low sensitivity of the control element and low reliability, elements which do not meet the safety and quality conditions required by NPP high power units.

OBJECT OF THE INVENTION

The object of the invention is to increase the NPP efficiency, based on heat extraction from the turbine and to use it for district heating, with hot water as the heat transfer.

SUMMARY OF THE INVENTION

The invention provides indirect control of the steam extracted from the turbine and its automatic limitation according to the restrictions required by the turbine and the steam generator and reactor operating assembly.

The control system for heat supply from a NPP equipped with condensation units, according to the invention, avoids the above mentioned disadvantages through the fact that, for heat supply hot water is used in a district heating system and such use increases the overall efficiency of NPP.

The system of the invention comprises means for effecting a nonadjustable bleeding of steam from the turbine. The steam flow passes through a check valve, a flow nozzle, a valve, a heat exchanger, a condensate line, another heat exchanger, and a slide valve and is returned as condensate to the main condenser. Hot water is prepared by heating the water from the return line, and for this purpose a control valve, a flowmeter, a hot water heat exchanger, and the heat exchanger for steam water heat exchange are provided. The resulting hot water is supplied to the user. The control of heat supply is indirectly regulated through flow control in response to the district heating secondary circuit by means of a motorized control valve. This control valve is actuated by means of a control signal from a hand switch. The water-flow change determines the change of steam flow inside the district heating primary circuit, i.e., of the steam extracted at the turbine by the nonadjustable bleeding. Supervision of heat supply control is effected by means of a control valve position indicator and a position transmitter. The circulated water flow supervision and the monitoring of the supplied heat quantity are effected by means of a flowmeter, transmitter, thermoresistances and a heat quantity calculation unit. In case that the steam flow extracted from the turbine nonadjustable bleed is higher than 12% from the instant steam flow, turbine protection is brought into play through a control loop consisting of a pressure transmitter, a steam flow nozzle, another pressure transmitter, and a comparing and control unit which actuates the motorized valves on the steam and condensate lines.

BRIEF DESCRIPTION OF THE DRAWING

The sole FIGURE of the accompanying drawing is a flow diagram of a control and protection system providing a heat supply as hot water from the NPP condensation units.

SPECIFIC DESCRIPTION

Figure 1:
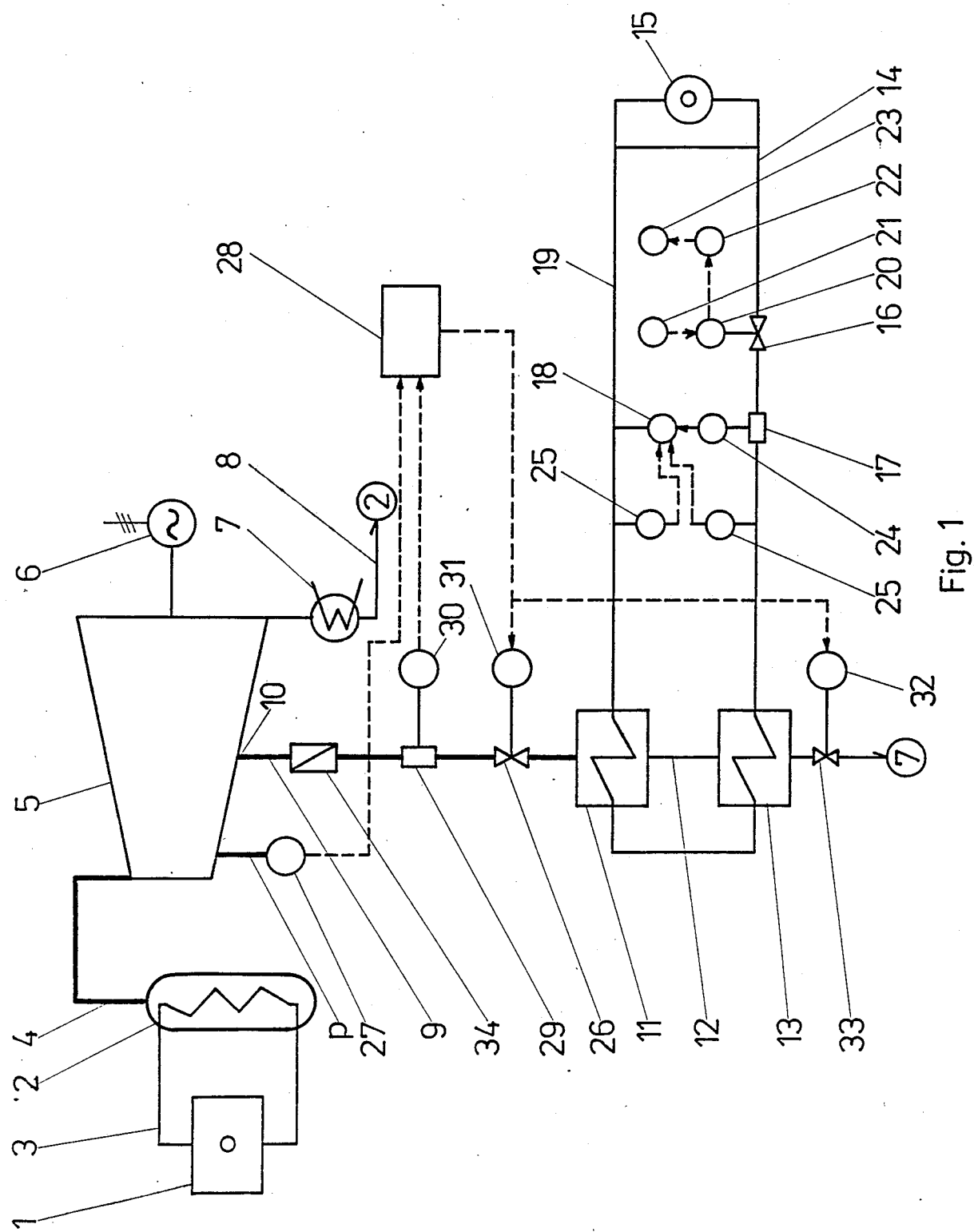

The existing process systems in a nuclear power plant provide the heat supply in the reactor 1, the transport of this heat to the steam generator 2, through the heavy water line 3 and the steam production in the steam generator 2.

From the steam generator 2, the steam circulates through the steam line 4, to the turbine 5, then reaching the condenser 7, from which, through the line 8, the condensate returns to the steam generator 2.

The steam expanded in turbine 5, drives the electric generator 6, which generates electric power.

The control system for heat supply from nuclear power plants equipped with condensation units, according to the invention, consists of the following circuits: the primary district heating circuit made up of a steam line 9, through which the steam extracted by a nonadjustable bleed 10, passes through the steam-water heat exchanger 11, and results as condensate which further on, through a line 12, will be under cooled in a steam-water heat exchanger 13, then sent back to the condenser 7 by line 7a. The secondary district heating circuit comprising a hot water return line 14, from a heat user 15, which is passed through a control valve 16 and a flowmeter 17. The hot water is heated in the heat exchangers 13 and 14.

The absorbed heat, which is measured by the calculation unit of a heat counter 18, is sent as hot water through a supply line 19, to the heat users 15.

According to the invention, the control system is used for the indirect control of the steam flow extracted from the nonadjustable bleeding 10, of the turbine 5, which is passed through water-steam heat exchanger 11, and then as condensate through water-water heat exchanger 13, and finally introduced in condenser 7. The control of the extracted steam flow is performed indirectly by the variation of the warm water flow in the secondary district heating circuit. This water is heated as result of the steam condensation and excess cooling of the resulting condensate. The variation of the water flow is performed so that it should meet the heat supply requirements of the user 15, and the constraints imposed to the size and rate of thermal load response by the turbine 5 and by the assembly formed by turbine 5, steam generator 2 and reactor 1. The control is performed by the control valve 16, actuated by an electric motor 20, as result of a signal initiated from a control hand switch 21, by the power unit operator.

The following up of the control valve 16 opening position is performed by a position transducer 22, and by a valve 16, position indicator 23.

The following-up of the heat supply control is performed by an electromagnetic type flowmeter 17, which by means of a transmitter 24, transmits a signal to the heat calculation unit 18, for the recording and indicating of the water flow. Two thermoresistances 25, issue electric signals for the water temperatures in the lines 14 and 19, to the calculation unit 18. The calculation unit 18, establishes the amount of heat supplied, so that the power unit operator can be informed on the results of the heat supply control.

When the steam flow for district heating purposes exceeds 12% of the momentary flow on the line 4, at the turbine 5 inlet the turbine protection is obtained by the automatic closing of a shut-off valve 26 on the steam line 9. The protection was obtained by providing two measuring loops with unified signals as follows:

the loop which measures the steam flow at the turbine 5 inlet based on the pressure signal, taken after the Curtis wheel, signal yielding a signal which is equivalent to the momentary load of the turbine. The pressure signal is converted into a unified signal by a transmitter 27, and introduced into a comparing and control unit 28.

the loop for measuring the steam flow extracted from the steam bleeding 10. This measurement which is obtained by a flow nozzle 29, which measures the steam flow and converts the value of the steam in a differential pressure signal which is converted into a unified signal by a transmitter 30 and introduced into the comparing and control unit 28.

The unit 28 issues a signal at its outlet; in case the difference between these two values is equal or greater than zero.

The unit 28 output signal is transmitted to the electric motors 31 and 32 of the shut-off valve 26 and 33 on the steam bleeding line and on the discharged condensate, respectively.

For the turbine protection, a check valve 34 is also provided.

Based on the necessary thermal load set by the power unit operator and examining the operating parameters of the assembly formed by reactor 1, steam generator 2, turbine 5 and electric generator 6, (i.e. steam flows, electric power) and of the heat supply system (i.e. flows, pressures, temperatures, amount of heat supplied, position of the control valve 16) the new operating mode of the district heating system is established. It is specified that the thermal load supplied is determined with the relation:

$$Q = G(td - ti)$$

in which:
td = temperature in the supply line 19
ti = temperature in the return line 14

Thus the water flow is established by means of the control valve 16 and then the resulting temperature in the supply 1 line 19, and the heat load supplied are observed by means of the heat calculation unit 18.

The control system, according to the invention, has the following advantages:

it supplies heat in a district heating operating mode (-combined heat and electric power generation) from the nuclear power plant equipped with condensation turbines, by modifying the steam extraction from a nonadjustable steam bleeding and by observing the constraints imposed by the turbine and by the assembly formed by reactor, steam generator and turbine it provides substantial fuel savings by generating electric power in cogeneration conditions with heat, by increasing the overall efficiency of the nuclear power plant it supplies heat economically to the existing and new users, over a radius of tens of kilometers, thus saving hydrocarbons used by the existing users operating on this type of fuel or avoiding the construction of some power plant running on solid fuels and facing severe problems concerning their design and operation.

What is claimed is:

1. A system for simultaneously generating electricity and producing heat for district heating, said system comprising:
    an electricity-generating unit including:
    a nuclear reactor,
    a steam generator connected to said nuclear reactor,
    a steam turbine connected to said steam generator,
    a condenser connected to said steam turbine,
    a return line for feeding condensate formed in said condenser to said steam generator, and
    a generator connected to and driven by said turbine for generating electricity;
    steam-extraction means connected to said turbine and including:
    a nonadjustable steam bleed communicating with said turbine,
    a checkvalve connected to said nonadjustable steam bleed,
    a steam flow nozzle connected to said checkvalve,
    a steam-flow-control valve connected to said steam flow nozzle,
    a steam/water heat exchanger connected to said steam-flow-control valve and in which steam is condensed,
    a water/water heat exchanger connected to said steam/water heat exchanger and traversed by water formed by the condensation of steam in said steam/water heat exchanger, and
    a water-return valve connecting said water/water heat exchanger to said condenser to feed water formed by the condensation of steam in said steam/water heat exchanger to said condenser;
    a hot-water heating unit including:
    a return line conveying heat-carrying water in succession through said water/water and said steam/water heat exchangers for indirect heat exchange therein,
    a hot-water control valve in said return line,
    a flowmeter in said return line and a signal transmitter connected to said flowmeter,
    a hot-water feed line connected to said steam/water heat exchanger, a thermoresistance in each of said return line and said hot-water feed line, and
    at least one heat user between said hot-water feed line and said return line;
    a heat supply controller effective on said hot-water heating unit for controlling the steam bled by said nonadjustable steam bleed, said heat supply controller including:
    an electric motor connected with said hot-water control valve,
    a hand switch connected to said electric motor for actuating same,
    position transducer connected to said hot-water control valve for signalling the degree of opening thereof, and calculating means for monitoring the supply of heat to said user, said calculating means receiving temperature indications from said thermoresistances in said feed and return lines and an input from said transmitter connected to said flowmeter and means for protecting said turbine upon the steam flow from said nonadjustable bleed exceeding 12% of the instantaneous flow from said generator to said turbine; and including a first pressure transducer responsive to pressure in said turbine;

a second pressure transducer responsive to pressure in said steam flow nozzle;

a comparing and control unit receiving inputs from said pressure transducers, and responsive electric motors connected to said comparing and control unit for operating said steam-flow-control valve and said water-return valve for isolating said heat exchangers from said nonadjustable bleed and said condenser respectively.

* * * * *